US009347427B2

(12) United States Patent
Fischer

(10) Patent No.: US 9,347,427 B2
(45) Date of Patent: May 24, 2016

(54) WIND TURBINE ROTOR BLADE HAVING A THICK PROFILE TRAILING EDGE

(75) Inventor: Gunter Fischer, Hamburg (DE)

(73) Assignee: Nordex Energy GmbH, Hamburg (DE)

( * ) Notice: Subject to any disclaimer, the term of this patent is extended or adjusted under 35 U.S.C. 154(b) by 891 days.

(21) Appl. No.: 13/604,295

(22) Filed: Sep. 5, 2012

(65) Prior Publication Data

US 2013/0071253 A1 Mar. 21, 2013

(30) Foreign Application Priority Data

Sep. 19, 2011 (EP) ..................................... 11007613

(51) Int. Cl.
*F03D 1/06* (2006.01)
(52) U.S. Cl.
CPC .............. *F03D 1/065* (2013.01); *F03D 1/0608* (2013.01); *F05B 2240/311* (2013.01); *F05B 2260/96* (2013.01); *Y02E 10/721* (2013.01)
(58) Field of Classification Search
CPC ... F03D 1/0608; F03D 1/0633; F03D 1/0641; F03D 1/065; F03D 1/0683; F05B 2240/311; F05B 2260/96
USPC .................................... 415/119; 416/228, 235
See application file for complete search history.

(56) References Cited

U.S. PATENT DOCUMENTS

| 2007/0077150 | A1 | 4/2007 | Llorente Gonzalez | |
| 2008/0166241 | A1* | 7/2008 | Herr et al. ................. | 416/241 R |
| 2008/0187442 | A1 | 8/2008 | Standish et al. | |
| 2010/0047070 | A1* | 2/2010 | Slot et al. .................. | 416/146 R |

FOREIGN PATENT DOCUMENTS

| DE | 103 40 978 A1 | 4/2005 | |
| DE | 10 2008 003 188 A1 | 7/2009 | |
| WO | WO 2008035149 A2 * | 3/2008 | ............... F03D 1/06 |

* cited by examiner

*Primary Examiner* — Nathaniel Wiehe
*Assistant Examiner* — Jason Davis
(74) *Attorney, Agent, or Firm* — Walter Ottesen, P.A.

(57) ABSTRACT

A wind turbine rotor blade having an aerodynamic profile which is formed in a longitudinal section of the rotor blade and which has a pressure side, a suction side, a profile leading edge and a profile trailing edge with a thickness of 3 mm or greater, characterized by a plurality of bristles which are arranged on the profile trailing edge and which are arranged in a suction-side row and in a pressure-side row, the suction-side row forming an aerodynamic surface which forms a smooth continuation of the suction side, and the pressure-side row forming an aerodynamic surface which forms a smooth continuation of the pressure side.

4 Claims, 2 Drawing Sheets

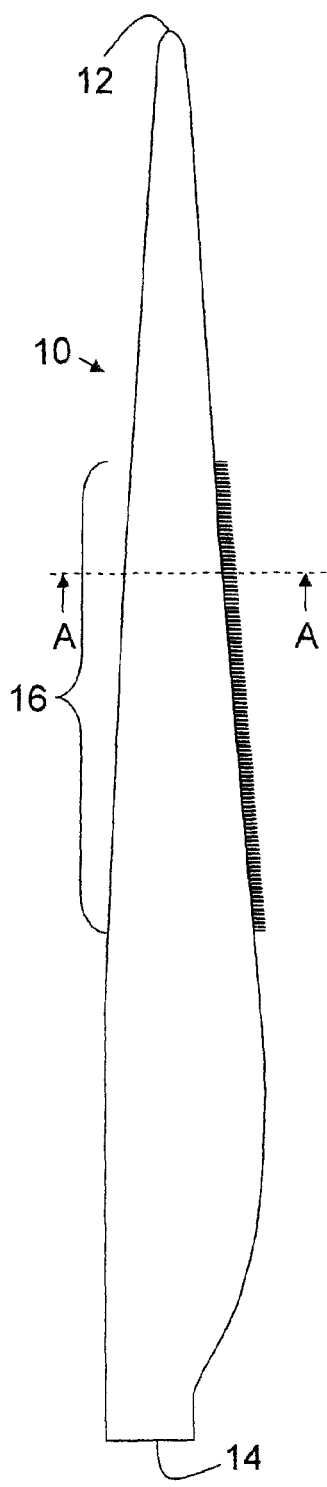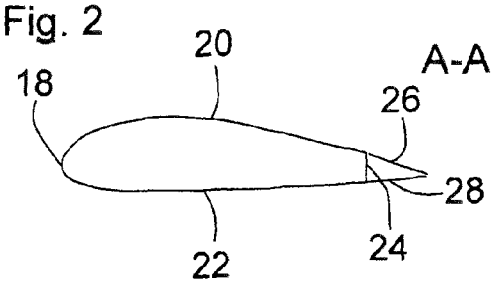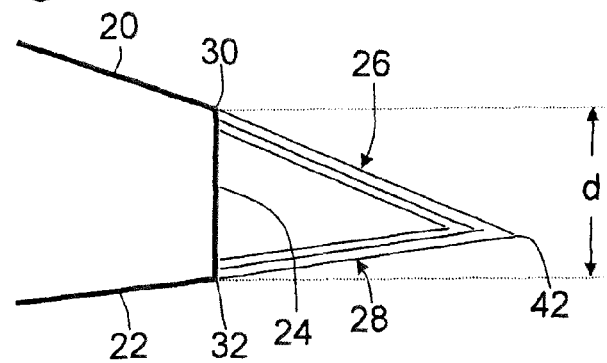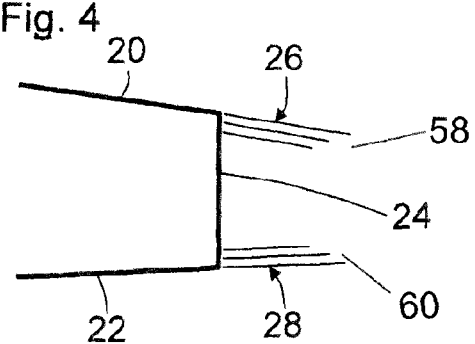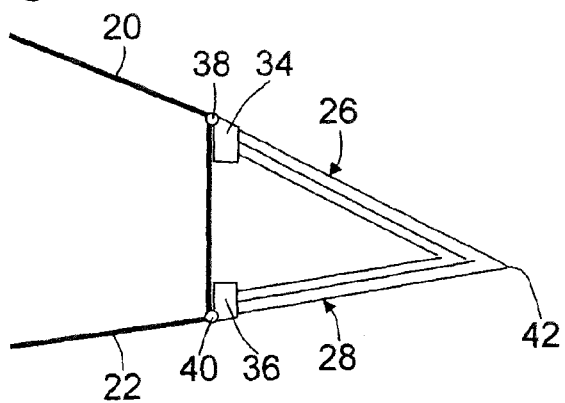

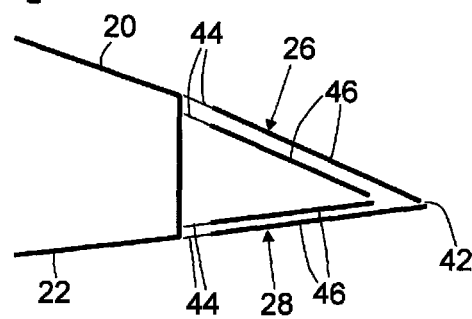
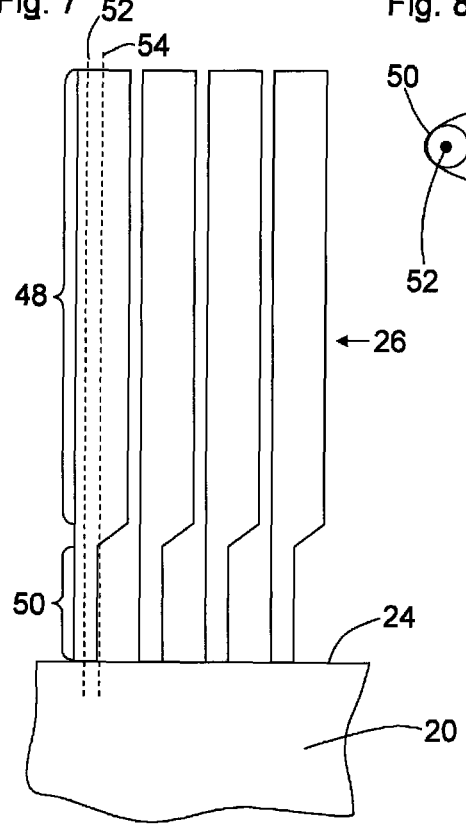
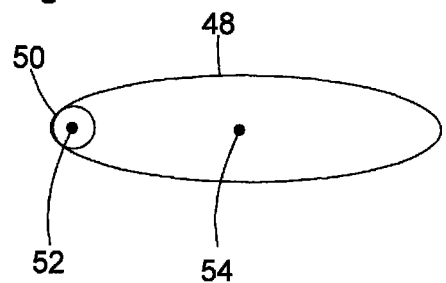

WIND TURBINE ROTOR BLADE HAVING A THICK PROFILE TRAILING EDGE

CROSS REFERENCE TO RELATED APPLICATION

This application claims priority of European patent application no. 11007613.0, filed Sep. 19, 2011, the entire content of which is incorporated herein by reference.

FIELD OF THE INVENTION

The invention relates to a wind turbine rotor blade having an aerodynamic profile which is formed in a longitudinal section of the rotor blade and which has a pressure side, a suction side, a profile leading edge and a profile trailing edge with a thickness of 3 mm or greater.

BACKGROUND OF THE INVENTION

From an aerodynamic aspect, wind turbine rotor blades with thin trailing edges, that is with pressure and suction sides which converge at a point as viewed in profile, are optimal. For structural reasons, however, in particular in the case of wind turbines with a horizontal axis, very large relative profile thicknesses are required in the region of small radii, that is close to a rotor axis. In particular, a sufficient bending stiffness to ensure adequate strength of the rotor blades is attained only with large profile thicknesses. In order that flow separation does not occur in the case of large relative profile thicknesses, so-called thick profile trailing edges are used. These are used in particular in the region of small radii in virtually all modern wind turbines.

At larger radii, that is at a greater distance from the rotor axis, thick profile trailing edges can generally no longer be used successfully because two negative effects arise owing to the higher flow speeds there. Firstly, the air is forced by the thick profile trailing edge to form, downstream of the profile, a Kármán vortex street which oscillates with a characteristic frequency, thus generating so-called trailing edge noise. The sound pressure of said noise increases with the thickness of the profile trailing edge. Secondly, owing to flow separation at the pressure-side and suction-side ends of the trailing edge, a recirculation field in which merely ambient pressure prevails is formed behind the profile trailing edge. This generates suction counter to the flow direction, which leads to an increased pressure resistance of the wind turbine rotor blade. The aerodynamic performance of the rotor blade is impaired as a result.

United States patent application publication 2010/0047070 discloses a wind turbine rotor blade in which an additional sharp-edged profile or a plate with a cross section which is constant in the longitudinal direction of the rotor blade is arranged on a thick profile trailing edge. The sharp-edged profile is intended to reduce the effective thickness of the profile trailing edge to approximately zero. In the variant with a plate, the plate is supposed to be inserted between the lower and upper half-shells of the rotor blade. It is thereby sought to counteract the vortex shedding of the flows on the pressure and suction sides.

United States patent application publication 2007/0077150 discloses a wind turbine rotor blade in which a row of bristles is arranged on a thin profile trailing edge. The bristles are intended to compensate pressure fluctuations on the two sides of the profile, and thereby counteract the generation of noise. A similar arrangement of bristles on a thin profile trailing edge on a wind turbine rotor blade is also presented by document DE 10 2008 003 188 A1.

SUMMARY OF THE INVENTION

On the basis thereof, it is the object of the invention to improve a wind turbine rotor blade such that an aerodynamic profile with a thick profile trailing edge can be used expediently even at larger radii.

The wind turbine rotor blade of the invention includes: a longitudinal section defining an aerodynamic profile; the aerodynamic profile having a pressure side, a suction side, a profile leading edge and a profile trailing edge; the profile trailing edge having a thickness (d) of at least 3 mm; a plurality of bristles arranged on the profile trailing edge; the bristles being arranged in a suction side row and in a pressure side row; the suction side row being configured to form an aerodynamic surface which forms a smooth continuation of the suction side; and, the pressure side row being configured to form an aerodynamic surface which forms a smooth continuation of the pressure side.

The wind turbine rotor blade has an aerodynamic profile which is formed in a longitudinal section of the rotor blade, and which has a pressure side, a suction side, a profile leading edge and a profile trailing edge with a thickness of 3 mm or greater. The wind turbine rotor blade furthermore has a plurality of bristles which are arranged on the profile trailing edge and which are arranged in a suction-side row and in a pressure-side row, the suction-side row forming an aerodynamic surface which forms a smooth continuation of the suction side, and the pressure-side row forming an aerodynamic surface which forms a smooth continuation of the pressure side.

The wind turbine rotor blade is provided in particular for a rotor having a horizontal axis. The rotor blade may be produced from a fiber-reinforced plastic material, in particular from two half-shells which are connected to one another. The rotor blade may have a blade root for connecting to a rotor hub, for which purpose said rotor blade may in particular be provided with a fastening flange on the blade root. The rotor blade may have a length of for example 20m, 30 m, 40 m or greater. The pressure side and suction side extend in each case on a top and bottom side, respectively, of the wind turbine rotor blade from the profile leading edge to the profile trailing edge.

In the case of wind turbine rotor blades with a thin trailing edge, a convergence as sharp-edged as possible of the pressure side and suction side is desirable. For production reasons, however, the profile trailing edges of such rotor blades nevertheless have a certain thickness, often in the range from 1 mm to 2 mm. Profiles with a relatively thicker trailing edge may be referred to as profiles with a thick profile trailing edge.

In the longitudinal section of the rotor blade in which the aerodynamic profile is arranged, the profile trailing edge is such a thick profile trailing edge. The thickness of this profile trailing edge is at least 3 mm; it can, however, also be significantly greater, and may be, for example 5 mm, 10 mm, 20 mm, 50 mm, 100 mm or greater.

The bristles can have an elongated shape. They also have an elasticity of such a magnitude that they can, depending on the flow conditions, assume a position which deviates from their rest position.

The bristles are arranged in two rows which may run substantially in the longitudinal direction of the wind turbine rotor blade. One of these rows is referred to as the suction-side row, and the other is referred to as the pressure-side row. Within the rows, the bristles can be at relatively small distances from one another or may even adjoin one another. In any case, the distances between the bristles and the dimensions of the bristles are such that, during operation of the rotor blade, the bristles arranged in rows collectively act in each case as an aerodynamic surface. In particular, the flow can flow off smoothly along these surfaces.

That the two aerodynamic surfaces form smooth continuations of the suction side and of the pressure side respectively means that the aerodynamic surfaces adjoin the suction side and the pressure side respectively in the region of the profile trailing edge in such a manner that the flow at the pressure side can flow off along the aerodynamic surface formed by the pressure-side row, and the flow at the suction side can flow off along the aerodynamic surface formed by the suction-side row. For this purpose, it is necessary firstly for the orientations of the pressure side and suction side and of the aerodynamic surfaces which form continuations thereof to substantially correspond to one another in the region close to the profile trailing edge. Furthermore, between the pressure or suction side and the aerodynamic surface which forms a respective continuation thereof, no step which leads to more intense flow separation or turbulence should be formed. Relatively small steps and also relatively small deviations in the orientation of the respectively adjoining surfaces are however acceptable as long as, under normal usage conditions, a substantially smooth flow-off is possible over the aerodynamic surfaces formed by the bristles.

That longitudinal section of the rotor blade in which the special aerodynamic profile is formed can have a length of for example 5%, 10%, 25%, 50% or more of the overall length of the rotor blade. The longitudinal section can be formed at a distance from the blade root and/or at a distance from the blade tip. In particular, the longitudinal section may be situated in a central region of the wind turbine rotor blade. It is also possible for a plurality of longitudinal sections to be arranged distributed over the length of the rotor blade at different radius positions.

With regard to its aerodynamic effect, the profile including the aerodynamic surfaces formed by the bristles can correspond to that of a conventional profile with a thin trailing edge. This applies in particular during regular operation of the wind turbine, when the aerodynamic profile is impinged on by flow from the front. In this case, the flow on the pressure side and on the suction side of the profile can flow off cleanly over the aerodynamic surfaces formed by the bristles. Here, the trailing edge noise observed in the case of conventional profiles with a thick trailing edge is eliminated or at least considerably reduced. Since the trailing edge formed in this manner by the bristles is finely resolved owing to the plurality of bristles, the generation of noise can under some circumstances be reduced even in relation to a conventional thin trailing edge. The increased pressure resistance associated with conventional thick profile trailing edges can also be eliminated or considerably reduced.

At the same time, as a result of the use of the bristles in the arrangement according to the invention, the structural advantages of a thick profile trailing edge are attained. Through the use of the bristles, which have a certain degree of flexibility, the effective profile depth in the case of an incident flow on the rotor blade from the pressure side or from the suction side, for example in the event of extreme gusts of wind, is reduced because the bristles are deflected from their rest position and no longer act as an aerodynamic surface. By contrast to a profile with a thin trailing edge, it is possible in this way for the extreme loads in the event of gusts of wind, and in the case of flow directions deviating from normal conditions, to be reduced. This permits an improved strength-to-weight ratio of the rotor blade.

In one embodiment, the thickness of the profile trailing edge is less than 10 cm. As already described, in the case of conventional wind turbine rotor blades, profiles with a thick profile trailing edge are generally used in the region of very small radii, wherein the thickness of the profile trailing edges close to the blade root may be for example 50 cm or greater. In principle, the invention can also be used in these rotor blade regions. The invention is, however, preferably used in the case of thicknesses of the profile trailing edge of 10 cm or less.

In one embodiment, the bristles of the suction-side row run in the direction of a tangent to the suction side, and the bristles of the pressure-side row run in the direction of a tangent to the pressure side. The respective tangents are aligned with the suction side and the pressure side, respectively, in particular in the region of the profile trailing edge or at the profile trailing edge. If the bristles are also arranged with their longitudinal direction in this direction, the aerodynamic surfaces formed by the rows of bristles form a smooth continuation of the respective sides of the rotor blade, so that a smooth flow-off over the profile trailing edge is promoted. In principle, it is not necessary for the bristles to be situated with their longitudinal direction in the aerodynamic surface formed by the respective rows of bristles. It is also conceivable for the bristles to collectively form the respective aerodynamic surface through a suitable variation of their lengths. However, the alignment of the longitudinal direction of the bristles in the direction of the formed aerodynamic surfaces, in particular along the flow direction at the aerodynamic surfaces, results in the desired effect being attained in a particularly simple manner.

In one embodiment, the profile trailing edge has a suction-side end point, at which it meets the suction side, and a pressure-side end point, at which it meets the pressure side, and the bristles of the suction-side row each have one fastened end which is arranged at a distance of 30% of the thickness of the profile trailing edge or less from the suction-side end point and/or the bristles of the pressure-side row each have one fastened end which is arranged at a distance of 30% of the thickness of the profile trailing edge or less from the pressure-side end point. In this case, a free space which amounts to at least 40% of the thickness of the profile trailing edge remains on the profile trailing edge between the two rows of bristles. The respective rows of bristles are collectively fastened, close to the aerodynamic surfaces which they are intended to form, to the profile trailing edge. This promotes the effect of the rows of bristles as aerodynamic surfaces. Furthermore, in the event of flows which are perpendicular to the aerodynamic surfaces formed, a deformation of the rows of bristles in the desired way is promoted.

In one embodiment, free ends of the bristles of the suction-side row are arranged close to free ends of the bristles of the pressure-side row, so that the aerodynamic surfaces formed by the bristles converge along a trailing edge. That the free ends of said bristles are arranged close to one another means that the free ends at least partially come into direct contact, or that there are only small distances between the free ends of the bristles. The distances may for example not exceed 10 times a bristle diameter or 20% of the average length of the bristles. As a result, the two aerodynamic surfaces formed by the two rows of bristles substantially converge so as to form a single thin trailing edge, and under regular flow direction conditions, the wind turbine rotor blade has aerodynamic characteristics similar to those of a conventional rotor blade with a thin trailing edge.

In one embodiment, the lengths of the bristles are dimensioned such that the bristles of the suction-side row and/or the bristles of the pressure-side row taper out with increasing distance from the profile trailing edge. In other words, the number of adjacently arranged bristles decreases with increasing distance from the profile trailing edge. In this way, it is possible to realize a particularly thin trailing edge formed by the bristles.

In one embodiment, bristles of the suction-side row and/or bristles of the pressure-side row are held in bodies which are articulatedly connected to the profile trailing edge. In principle, it is possible that the individual bristles can be fastened to the wind turbine rotor blade in any desired manner, for example by virtue of the bristles being directly adhesively bonded to a half-shell, which forms the respective distance of the profile trailing edge, of the rotor blade, or by virtue of the bristles being enclosed or embedded in the respective half-shell. Alternatively, a plurality of bristles, which have in particular been combined to form bundles, can be fastened in or on a base body, in a manner similar to a brush head. The base body may then in turn be connected to the other components of the rotor blade, in particular to one of the half-shells, for example by means of a screw connection or adhesive bonding. In this embodiment, such a body, in which at least a subset of the bristles of one of the two rows is held, is articulatedly connected to the profile trailing edge. This allows the bristles to pivot from their position in which they form a continuation of the pressure side or suction side, respectively, for example into a position in which they bear against the pressure side or against the suction side of the rotor blade. Such pivoting of the bristles may be expedient for example for transportation purposes. Furthermore, as a result of the articulated connection, the angle at which the bristles, and thus the aerodynamic surfaces formed by the bristles, are aligned relative to the other components of the rotor blade can be varied and adapted to requirements.

In one embodiment, at least a subset of the bristles has a flat cross section. In principle, the bristles may have any desired cross section, in particular may be square or circular. Bristles which are flat in cross section, in particular with a rectangular, oval or elliptical cross section, may with suitable arrangement attain the desired action as an aerodynamic surface in a simpler manner or preferably be more easily deformable in certain directions than in others. The wider part of the cross section of the bristles may for example be aligned in the direction of the respective row of bristles, such that a wide side of the bristles faces toward the aerodynamic surface to be formed.

In one embodiment, at least a subset of the bristles is mounted so that each bristle thereof is rotatable about an axis of rotation, the axis of rotation being arranged so as to be offset with respect to and parallel to a central longitudinal axis of the respective bristle. For example, the cross section of a bristle which is flat in one longitudinal section may vary in the direction of a fastening point and decrease to a circular cross section, for example, which is arranged offset with respect to the center of the flat cross section. In the event of a corresponding incident flow on the flat longitudinal section of the bristle, the part of the bristle which has the laterally offset, circular cross section can perform a torsional movement and thus act as a rotatable bearing. Also conceivable is the use of separate bearing elements, for example a steel spring, to which the bristle is fastened. The flat bristles may also have a relatively large cross section and be of approximately lamellar shape. By means of the rotatable bearing arrangement illustrated, in the event of an incident flow which deviates from the normal flow direction, the aerodynamic surfaces formed by the bristles can open as a result of a rotation of the bristles, such that the bristles no longer act as an approximately closed aerodynamic surface. In this way, the loading of the rotor blade in particular in the event of strong gusts of wind can be reduced.

In one embodiment, at least a subset of the bristles is exchangeable. For example, the bristles may be enclosed in or fastened in some other way to base bodies which can be exchanged together with the bristles fastened thereon. An exchange of individual bristles is also conceivable. By means of this embodiment, rotor blades with damaged bristles can be repaired in a simple manner.

In one embodiment, in at least a subset of the bristles, each bristle has at least two longitudinal sections of different elasticity, a more elastic section being arranged at a fastened end and a more rigid section being arranged at a free end of the respective bristle. In this way, in particular in the case of relatively long bristles, a relatively planar aerodynamic surface is formed, and the bristles can simultaneously perform the desired movement in the event of an oblique incident flow.

BRIEF DESCRIPTION OF THE DRAWINGS

The invention will now be described with reference to the drawings wherein:

FIG. 1 shows a rotor blade according to the invention in a plan view;

FIG. 2 shows a cross section through the rotor blade from FIG. 1 along the plane labeled A-A;

FIG. 3 shows an enlarged detail of FIG. 2;

FIG. 4 shows a detail, corresponding to FIG. 3, of another rotor blade;

FIG. 5 shows a further detail, corresponding to FIG. 3, of a rotor blade with articulatedly fastened base bodies;

FIG. 6 shows a further detail, corresponding to FIG. 3, of a rotor blade with bristles which have longitudinal sections of different elasticity;

FIG. 7 shows a plan view of a detail of a suction side with a suction-side row of bristles; and, FIG. 8 shows one of the bristles from FIG. 7 in a plan view as seen from the profile trailing edge.

DESCRIPTION OF THE PREFERRED
EMBODIMENTS OF THE INVENTION

All of the figures are schematic. Corresponding components of the different exemplary embodiments are denoted by the same reference symbols.

FIG. 1 shows a wind turbine rotor blade 10 having a blade tip 12 and a blade root 14. In a longitudinal section 16, the rotor blade has an aerodynamic profile, the features of which will be described on the basis of FIG. 2, which shows a cross section, by way of example, at the position of the rotor blade 10 labeled A-A.

The aerodynamic profile of FIG. 2 has a profile leading edge 18, a suction side 20, a pressure side 22 and a thick profile trailing edge 24. The thickness of the profile trailing edge 24 is 3 mm or greater, and in the illustrated example is approximately 20 mm. Bristles are arranged, specifically in a suction-side row 26 and a pressure-side row 28, on the profile trailing edge 24. These rows run in the longitudinal direction of the wind turbine rotor blade 10 and are shown in cross section in FIG. 2. The individual bristles of the suction-side row 26 and of the pressure-side row 28 run in each case approximately as an elongation of the profile surface of the cross section shown. The flow also runs in said cross-sectional plane during regular operation of the rotor blade 10.

FIG. 3 shows an enlarged detail of FIG. 2 including a rear section of the suction side 20 and of the pressure side 22 and also the profile trailing edge 24 and the suction-side row 26 and the pressure-side row 28 of the bristles. The figure schematically shows the arrangement of individual bristles within said rows of bristles. It can be clearly seen that the bristles of the suction-side row 26 collectively form an aerodynamic surface which forms a smooth rearward continuation of the suction side 20. Likewise, the bristles of the pressure-side row 28 collectively form an aerodynamic surface which forms a smooth rearward continuation of the pressure side 22.

The individual bristles each have a fastened end, which is fastened to the profile trailing edge 24, and a free end.

Free ends of the bristles of the suction-side row 26 are arranged close to the free end of the bristles of the pressure-side row 28, such that the aerodynamic surfaces formed by the bristles converge along a trailing edge 42. It is likewise shown in the figure that the free ends of individual bristles make contact with one another or at any rate are arranged at a small distance from one another.

It can also be seen in FIG. 3 that the profile trailing edge 24 has a suction-side end point 30, at which it meets the suction side 20, and a pressure-side end point 32, at which it meets the pressure side 22. The fastened ends of the bristles of the suction-side row 26 are fastened to the profile trailing edge 24 at a small distance from the suction-side end point 30. Likewise, the fastened ends of the bristles of the pressure-side row 28 are fastened to the profile trailing edge 24 at a small distance from the pressure-side end point 32. Between the regions in which the bristles are fastened to the profile trailing edge 24, the profile trailing edge 24 has a central section on which no bristles are arranged. The thickness of the profile trailing edge 24 is labeled d.

FIG. 4 shows a further embodiment in which the aerodynamic surface formed by the suction-side row 26 and the aerodynamic surface formed by the pressure-side row 28 do not converge to form a thin trailing edge but rather in which the free ends of the respective bristles are arranged at a greater distance from one another. With this arrangement, which is suitable in particular for very large thicknesses of the profile trailing edge 24, in the case of which a convergence of the suction-side row 26 and of the pressure-side row 28 to form a common trailing edge may be a problem, it is possible at least to attain a reduction in trailing edge noise, whereas a considerable reduction in the increased pressure resistance caused by the thick profile trailing edge 24 generally cannot be attained.

Referring to FIG. 4, the bristles have lengths which are dimensioned such that at least one of the suction-side row 26 of bristles and the pressure-side row 28 of bristles have bristles which thin out with increasing distance from the profile trailing edge 24 as indicated by reference numerals 58 and 60.

The further embodiment of FIG. 5 shows aerodynamic surfaces formed by a suction-side row 26 and a pressure-side row 28, the arrangement of which corresponds to that of FIG. 3. In contrast to FIG. 3, it is shown that the bristles of these rows of bristles are in each case enclosed in a base body 34 and 36 respectively. The base bodies 36, 34 are each fastened to the other components of the wind turbine rotor blade in each case via an articulated connection 38, 40. The angular positions of the suction-side row 26 and of the pressure-side row 28 can be controlled in this way. It is also possible for these rows of bristles to be folded over completely, for example for transportation purposes.

FIG. 6 shows a further embodiment having a suction-side row of bristles 26 and a pressure-side row of bristles 28. The bristles each have two different longitudinal sections. A more elastic section 44 is arranged at the fastened end and a more rigid section 46 is arranged at the free end of the respective bristle.

FIG. 7 shows a detail of a suction side 20 of a further embodiment. The profile trailing edge 24 runs perpendicular to the plane of the drawing. Also visible are the bristles of a suction-side row of bristles 26. Each of the bristles has a flat cross section in a longitudinal section 48 which is arranged remote from the profile trailing edge 24. In the direction of the profile trailing edge 24, this flat cross section narrows to form a circular cross section formed in the longitudinal section 50. The longitudinal section 50 with circular cross section acts as a torsion spring, such that the bristles are mounted so as to be rotatable about the axis of rotation 52. The axis of rotation 52 is situated so as to be offset at a distance with respect to and parallel to a central longitudinal axis 54 of the respective bristle.

The arrangement of the axis of rotation 52 and of the central longitudinal axis 54 with respect to the different cross sections of the bristle formed in the two longitudinal sections 48, 50 is illustrated in FIG. 8.

As FIGS. 7 and 8 show, the bristles have a width greater than the height thereof. Thus, segment 48 of the bristle has a flat cross section and segment 50 has a circular cross section as shown in FIG. 8.

It is understood that the foregoing description is that of the preferred embodiments of the invention and that various changes and modifications may be made thereto without departing from the spirit and scope of the invention as defined in the appended claims.

LIST OF REFERENCE SYMBOLS USED

10 Wind turbine rotor blade
12 Blade tip
14 Blade root
16 Longitudinal section
18 Profile leading edge
20 Suction side
22 Pressure side
24 Profile trailing edge
26 Suction-side row
28 Pressure-side row
30 Suction-side end point
32 Pressure-side end point
34, 36 Base body
38, 40 Articulated connection
42 Trailing edge
44 More elastic section
46 More rigid section
48 Longitudinal section with flat cross section
50 Longitudinal section with circular cross section
52 Axis of rotation
54 Central longitudinal axis
d Thickness of the profile trailing edge

What is claimed is:
1. A wind turbine rotor blade comprising:
a longitudinal section defining an aerodynamic profile;
said aerodynamic profile having a pressure side, a suction side, a profile leading edge and a profile trailing edge;
said profile trailing edge having a thickness (d) of at least 3 mm;
a plurality of bristles arranged on said profile trailing edge;
said bristles being arranged in a suction-side row and in a pressure-side row;

said suction-side row being configured to form an aerodynamic surface which forms a smooth continuation of the suction side;

said pressure-side row being configured to form an aerodynamic surface which forms a smooth continuation of the pressure side; and, said bristles having lengths which are dimensioned such that at least one of said suction-side row of bristles and said pressure-side row of bristles have bristles which thin out with increasing distance from said profile trailing edge.

2. A wind turbine rotor blade comprising:

a longitudinal section defining an aerodynamic profile;

said aerodynamic profile having a pressure side, a suction side, a profile leading edge and a profile trailing edge;

said profile trailing edge having a thickness (d) of at least 3 mm;

a plurality of bristles arranged on said profile trailing edge;

said bristles being arranged in a suction-side row and in a pressure-side row;

said suction-side row being configured to form an aerodynamic surface which forms a smooth continuation of the suction side;

said pressure-side row being configured to form an aerodynamic surface which forms a smooth continuation of the pressure side;

at least one base body articulatedly connected to the profile trailing edge; and, wherein at least one of said suction-side row of bristles and said pressure-side row of bristles is held in said base body.

3. A wind turbine rotor blade comprising:

a longitudinal section defining an aerodynamic profile;

said aerodynamic profile having a pressure side, a suction side, a profile leading edge and a profile trailing edge;

said profile trailing edge having a thickness (d) of at least 3 mm;

a plurality of bristles arranged on said profile trailing edge;

said bristles being arranged in a suction-side row and in a pressure-side row;

said suction-side row being configured to form an aerodynamic surface which forms a smooth continuation of the suction side;

said pressure-side row being configured to form an aerodynamic surface which forms a smooth continuation of the pressure side;

at least a subset of said bristles having a cross section having a width greater than the height thereof;

at least a subset of the bristles being mounted so that each bristle thereof defines a central longitudinal axis and is rotatable about an axis of rotation; and, said axis of rotation being arranged so as to be offset with respect to and parallel to said central longitudinal axis.

4. A wind turbine rotor blade comprising:

a longitudinal section defining an aerodynamic profile;

said aerodynamic profile having a pressure side, a suction side, a profile leading edge and a profile trailing edge;

said profile trailing edge having a thickness (d) of at least 3 mm;

a plurality of bristles arranged on said profile trailing edge;

said bristles being arranged in a suction-side row and in a pressure-side row;

said suction-side row being configured to form an aerodynamic surface which forms a smooth continuation of the suction side;

said pressure-side row being configured to form an aerodynamic surface which forms a smooth continuation of the pressure side;

in at least a subset of said bristles, each one of said bristles of said subset having at least first and second longitudinal segments of different elasticity;

said first segment having a fastening end whereat said one bristle is connected to said profile trailing edge and said second segment extending from said first segment to define a free end of said one bristle; and, said first segment having an elasticity which is greater than the elasticity of said second segment.

\* \* \* \* \*